March 10, 1953 A. GRANT ET AL 2,630,599
APPARATUS FOR REMOVING MEMBRANE OR SKIN FROM ANIMAL STOMACHS
Filed Feb. 20, 1951 3 Sheets-Sheet 1
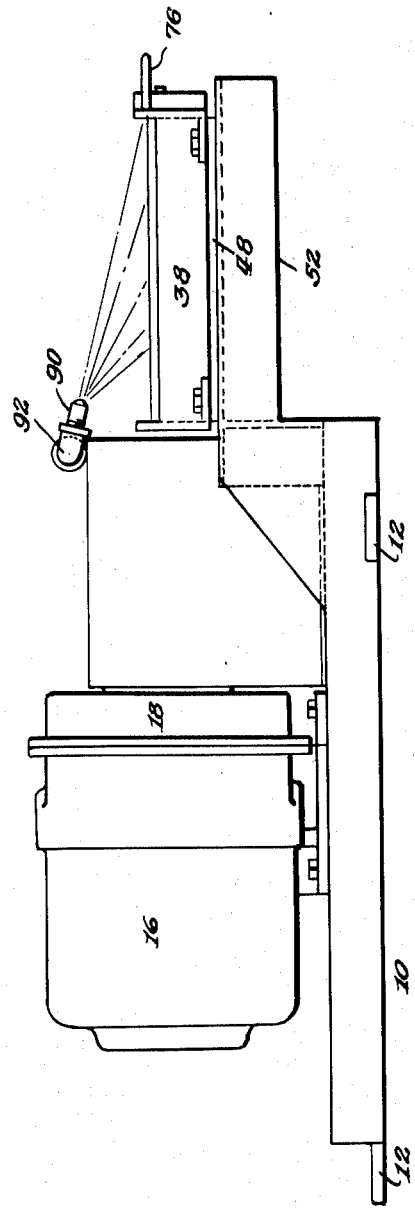
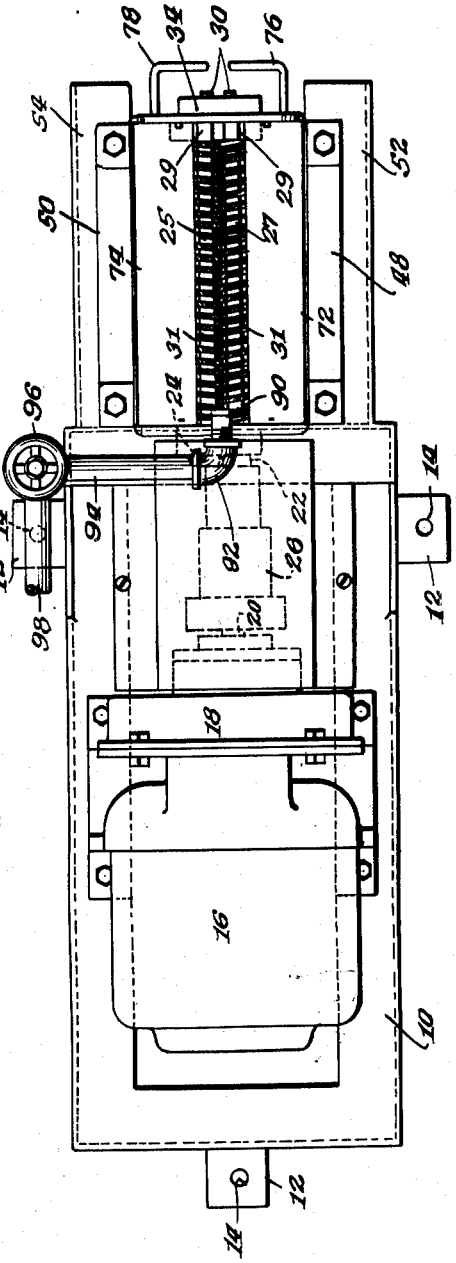
INVENTOR.
ALLAN GRANT
KENT TOMLINSON
BY
Harry H. Hitzeman
ATTORNEY.

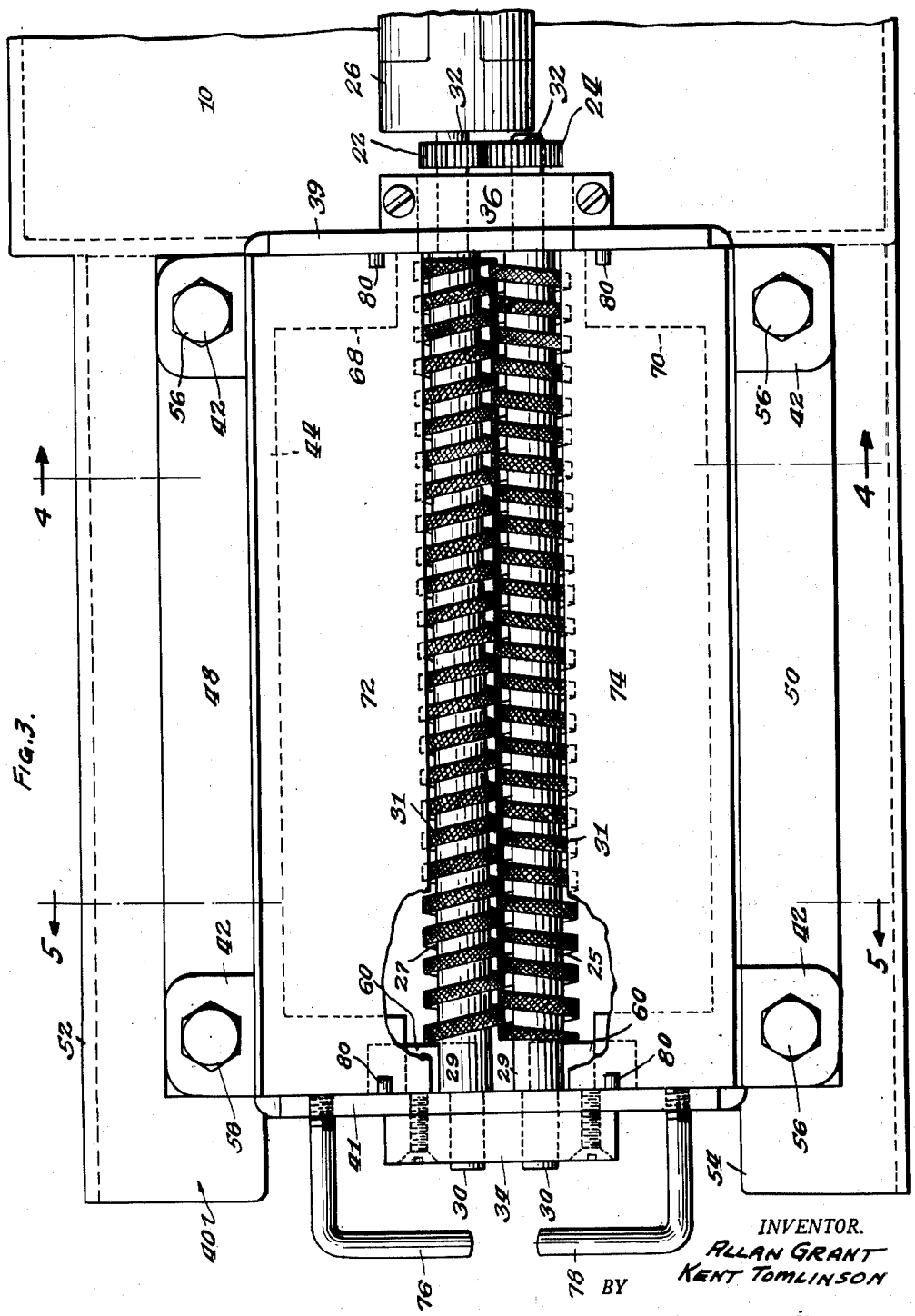

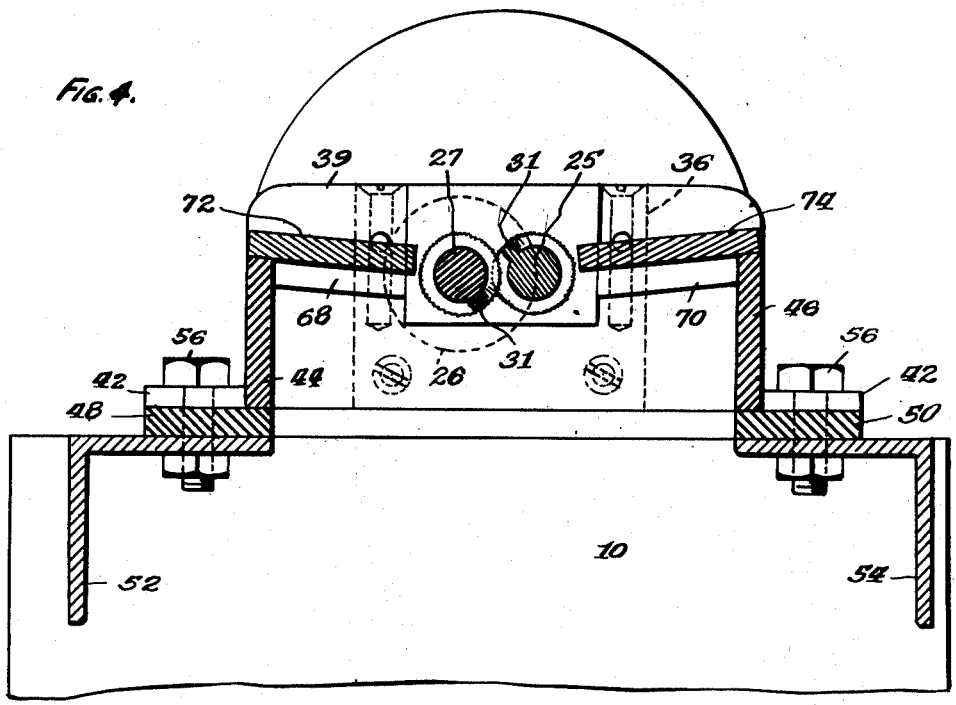
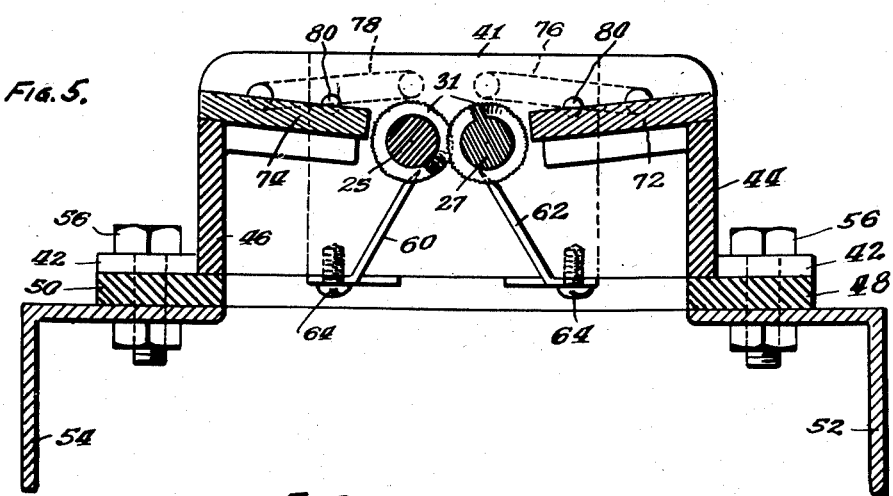
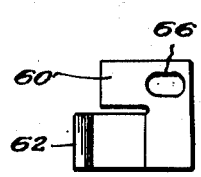

Patented Mar. 10, 1953

2,630,599

UNITED STATES PATENT OFFICE 2,630,599

APPARATUS FOR REMOVING MEMBRANE OR SKIN FROM ANIMAL STOMACHS

Allan Grant and Kent Tomlinson, Chicago, Ill.

Application February 20, 1951, Serial No. 211,902

13 Claims. (Cl. 17—43)

Our invention relates to improvements in the construction of apparatus for removing membrane or skin from animal stomachs.

The invention relates more specifically to the construction of apparatus of the type described which performs the operation referred to by a grinding or abrading action which serves to lacerate and shred the membrane or skin as it is passed over a pair of operating rolls.

The principal object of the present invention is to provide an improved machine for removing membrane or skin from animal stomachs by a grinding or shredding operation.

A further object of the invention is to provide such a machine equipped with a pair of self-cleaning grinding rollers.

A further object of the invention is to provide in a machine of the class described a pair of parallel, interengaging roller members with easily adjustable feeder bars or scrapers on each side of the same so that the machine may be used from either side.

A further object of the invention is to provide a machine of the type described having a pair of juxtapositioned similarly shaped cylindrical members having spirally disposed serrated ribs thereon extending from one end to the other so that they effect a feeding toward the lower end of the machine of shredded skin or membrane being removed.

A further object of the invention is the provision in a machine of the type described of cleaning or scraper means adjacent the lower ends of the scraper rolls whereby a continuous cleaning operation takes place whenever the machine is operated.

A further object of the invention is the provision of a machine of the type described that is easily and simply constructed and capable of operation by unskilled operators, yet sufficiently strong and durable so that it will not easily become broken or out of order in spite of long and hard usage.

Other objects and advantages will be more apparent from the following description wherein reference is had to the accompanying drawings upon which Fig. 1 is a side elevational view of one embodiment of our invention;

Fig. 2 is a plan view thereof;

Fig. 3 is an enlarged fragmentary view of the front portion of the machine showing the drive for the operating rollers;

Fig. 4 is a vertical cross-sectional view taken on the line 4—4 of Fig. 3 showing the mounting of one end of the operating rollers and the feeder bars or scrapers upon both sides of the same;

Fig. 5 is a similar vertical sectional view taken on the line 5—5 of Fig. 3 looking in the opposite direction and showing the cleaning or scraper means beneath the operating rolls at the forward end of the machine; and Fig. 6 is a plan view of one of the scraper or cleaner members shown in Fig. 5.

In the embodiment of the invention which is illustrated and described herein, the apparatus may include a base 10 provided with a plurality of fastening lugs 12 having the bolt holes 14 therein so that the same may be securely fastened upon an operating table or other suitable location.

The base is adapted to support a motor 16 adjacent the back end of the same, the motor 16 being connected to a gear reducer 18 which has a shaft 20 extending forwardly therefrom. The shaft 20 is adapted to drive a pair of face gears 22 and 24 through a slip clutch 26 which will prevent breakage or damage to the operating rollers under unusual or severe conditions.

The operating or skinning rolls 25 and 27 which we employ may each have reduced shaft portions 30 and 32 capable of mounting in the bearing members 34 and 36, the bearing members being secured to the outside vertical walls of a rectangular frame member 38 which is mounted upon a platform portion 40 of the base 10. Suitable lugs 42 extend outwardly from the two side walls 44 and 46 of the frame so that it may be fastened through a pair of rectangularly spaced spacers 48 and 50 to the angle members 52 and 54 which form the platform 40.

Suitable bolt members 56 fasten the frame 38 rigidly in position upon the platform 40 through the lug members 42 and rectangular members 48 and 50.

Referring again to the operating or skinning rollers 25 and 27, each of the rollers has a shank portion 29 slightly larger than the reduced ends or shoulders 30 and 32, and each of the rollers has a spirally disposed peripheral rib 31 extending from a point adjacent the end wall 39 of the frame 38 to a point spaced from the opposite end wall 41 of the frame 38. The spiral peripheral ribs have a serrated or roughened surface and are adapted to be inter-engaging or meshing as shown, so that then they are both rotated by means of the motor 16 and rotate in opposite directions, the spirals tend to travel from the back edge of the frame 38 forward to the shank portions 29 at the front end of the machine.

In this way, when the membrane or skin is being removed from an animal's stomach which may be held against the same, the granules or particles of loosened skin and sediment will be moved forward so that they may be dropped through the frame 38 at the reduced shank portions 29 of the rollers. To assist in preventing an accumulation of particles of skin or other sediment at this point, we provide a pair of scraper members 60 having the upwardly directed blade portions 62 and capable of being fastened to the lower edge of the end wall 41 of the frame 38 by means of screw members 64 which pass through elongated openings 66 in the base of the scraper members 60.

The upper side of the rectangular frame 38 may be provided adjacent its end walls 39 and 41 with a pair of support lugs 68 and 70. We position a pair of feeder bars or scraper members 72 and 74 upon both sides of the parallel skinning rollers 25 and 27, the feeder bars being generally rectangular in shape and adapted to be positioned on the ridges or lugs 68 and 70 so that they lie adjacent the peripheral edge of the serrated ridges 31.

Adjustment of these bars toward or away from the rollers is accomplished by means of loosening the holding bars 76 and 78 which are screw-threadedly mounted in the end wall 31 of the frame 38 and bear against the edges of the feeder bars 72 and 74 to rigidly hold them in adjusted position. A pair of pin members 80 are provided in both the end walls 39 and 41 to assist in holding the bars in desired position.

When the apparatus is being employed for removing the membrane or skin from the stomachs of the animals or for similar purposes it is frequently desirable to have a cleansing medium such as a spray of water directed against the work and the work rollers. Accordingly we have provided a source of water under pressure which may be connected to a spray nozzle 90 over the back edge of the spraying rolls and directed forwardly thereon from elbow member 92. A conduit 94 may extend from the nozzle through a valve 96 to a conduit 98 connected to the source of water under pressure.

The nozzle is screw-threadedly mounted in the end of the elbow 92 and may be angularly adjustable over the top of the operating rollers, and is also adjustable back and forth in the elbow as desired.

From the above and foregoing description it can be seen that we have provided a comparatively simple apparatus for removing the membranes or skins from animals' stomachs and for similar uses. Due to the spirally intertwined juxtapositioned skinning rollers it can be seen that as they are rotated in opposite directions and remove grits and other particles, such loose sediment and grits will be moved forward to the front end of the rollers by the spirally intertwined action of the same and will drop through the supporting frame at the shank portions 29 to prevent an accumulation at this point. The scraper blades 62 serve to continuously clean the shank portions of the rollers so that at all times a space is left for the dropping of the particles of skin, grits and other sediment.

The action of the spray of water will also tend to flow the particles to the front end of the skinning rollers so that with the apparatus provided there is in effect automatic cleaning of the surfaces of the rollers. This results in more efficient operation and also assists materially in the length of service of the rollers before sharpening or replacement is required.

While we have illustrated and described a specific embodiment of the invention, it will be apparent to those skilled in the art that changes and modifications may be made in the exact details shown, and we do not wish to be limited in any particular; rather what we desire to secure and protect by Letters Patent of the United States is:

1. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon.

2. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon, the ribs on each roller having a serrated surface and being in edge engagement throughout the length of said rollers.

3. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon, the ribs on each roller having a serrated surface and being in edge engagement throughout the length of said rollers, a rectangularly shaped frame, bearings at opposite ends of the same, said rollers mounted in said bearings.

4. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon and reduced shoulders at one end, the ribs on each roller having a serrated surface and being in edge engagement throughout the length of said rollers, a rectangularly shaped frame, bearings at opposite ends of the same, said rollers mounted in said bearings, and a pair of scraper blades mounted below one end of said rollers and engaging the reduced shoulders at one end of the ribs thereon.

5. Apparatus of the class described comprising a base, a motor mounted on the back end thereof, a horizontal drive shaft extending forward therefrom, a face gear driven by said shaft, a second face gear meshing with said first gear, a pair of similarly shaped rollers extending forward from said gears and adapted to be rotated in opposite directions, said rollers having intermeshing spiral peripheral ribs thereon, the surface of said ribs being serrated to effect a grinding action.

6. Apparatus of the class described comprising a base, a motor mounted on the back end thereof, a horizontal drive shaft extending forward therefrom, a face gear driven by said shaft, a second face gear meshing with said first gear, a pair of similarly shaped rollers extending forward from said gears and adapted to be rotated in opposite directions, said rollers having intermeshing spiral peripheral ribs thereon, the surface of said ribs being serrated to effect a grinding action, said spirals directed toward the front end of said rollers whereby membrane loosened by said grinding action is moved to the front end of the rollers and dropped.

7. Apparatus of the class described comprising a base, a motor mounted on the back end thereof, a horizontal drive shaft extending forward therefrom, a face gear driven by said shaft, a second face gear meshing with said first gear, a pair of similarly shaped rollers extending forward from said gears and adapted to be rotated in opposite directions, said rollers having reduced shoulders at their front ends, said rollers having intermeshing spiral peripheral ribs thereon, the surface of said ribs being serrated to effect a grinding action, said spirals directed toward the front end of said rollers whereby membrane loosened by said grinding action is moved to the front end of the rollers and dropped, and a pair of oppositely directed scraper blades mounted below the front end of said rollers for engaging the same.

8. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon, the ribs on each roller having a serrated surface and being in edge engagement throughout the length of said rollers, a rectangularly shaped frame, bearings at opposite ends of the same, said rollers mounted in said bearings, and a generally horizontally disposed combined feeder bar and scraper adjustably positioned on each side of said frame upon opposite sides of said rollers.

9. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, said rollers having interengaging spiral ribs thereon, the ribs having serrations on their surface and a pair of angularly disposed feeder bars, one positioned along the outer edge of the ribs of each roller.

10. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, said rollers having inter-engaging spiral ribs thereon and a reduced shank at their front end, the ribs having serrations on their surface and a pair of angularly disposed feeder bars, one positioned along the outer edge of the ribs of each roller.

11. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, said rollers having interengaging spiral ribs thereon and a reduced shank at their front end, the ribs having serrations on their surface and a pair of angularly disposed feeder bars, one positioned along the outer edge of the ribs of each roller, and a pair of angularly disposed scrapers mounted below said roller, one engaging each of said reduced shanks.

12. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon, the ribs on each roller having a serrated surface and being in edge engagement throughout the length of said rollers, a rectangularly shaped frame, bearings at opposite ends of the same, said rollers mounted in said bearings, and a generally horizontally disposed combined feeder bar and scraper adjustably positioned in said frame upon opposite sides of said rollers, said combined feeder bar and scraper extending between the ends of said rectangular frame.

13. Apparatus of the class described comprising a base, a motor mounted thereon, a horizontal drive shaft extending therefrom, a face gear driven by said shaft, a second face gear meshing with said first gear, a pair of similarly shaped rollers extending forward from said gears and adapted to be rotated in opposite directions, each of said rollers having spiral intermeshing ribs thereon, the ribs on each roller having a serrated surface and being in edge engagement throughout the length of said rollers, a rectangularly shaped frame, bearings at opposite ends of the same, said rollers mounted in said bearings, and a generally horizontally disposed combined feeder bar and scraper adjustably positioned in said frame upon opposite sides of said rollers, said combined feeder bar and scraper extending between the ends of said rectangular frame and bolt members in the end wall of said frame bearing against the edges of the feeder bars to rigidly hold them in adjusted position.

ALLAN GRANT.
KENT TOMLINSON.

REFERENCES CITED

The following references are of record in the file of this patent:

UNITED STATES PATENTS

| Number | Name | Date |
| --- | --- | --- |
| 747,263 | Streitwieser | Dec. 15, 1903 |
| 1,986,075 | Spang | Jan. 1, 1935 |
| 2,169,905 | Sevek | Aug. 15, 1939 |
| 2,290,812 | Norman | July 21, 1942 |
| 2,310,067 | Doering et al. | Feb. 2, 1943 |